United States Patent
Narita et al.

(10) Patent No.: US 7,203,468 B2
(45) Date of Patent: Apr. 10, 2007

(54) SIGNAL GENERATION DEVICE (75) Inventors: Masahiro Narita, Gifu (JP); Yasunori Akatsuka, Gifu (JP)

(73) Assignees: Sanyo Telecommunications Co., Ltd., Osaka (JP); Sanyo Electric Co., Ltd., Osaka (JP)

( * ) Notice: Subject to any disclaimer, the term of this patent is extended or adjusted under 35 U.S.C. 154(b) by 55 days.

(21) Appl. No.: 10/486,358

(22) PCT Filed: Mar. 4, 2002

(86) PCT No.: PCT/JP02/01964

§ 371 (c)(1),
(2), (4) Date: Aug. 2, 2004

(87) PCT Pub. No.: WO03/021799

PCT Pub. Date: Mar. 13, 2003

(65) Prior Publication Data

US 2004/0248526 A1 Dec. 9, 2004

(30) Foreign Application Priority Data

Aug. 29, 2001 (JP) ............................. 2001-260286

(51) Int. Cl.
*H04B 1/04* (2006.01)
*H04L 25/03* (2006.01)
(52) U.S. Cl. .................. 455/114.2; 455/570; 375/296
(58) Field of Classification Search ............ 455/114.2, 455/114.3, 127.2, 127.5, 570; 375/146, 295, 375/296
See application file for complete search history.

(56) References Cited

U.S. PATENT DOCUMENTS

| 5,881,054 A | 3/1999 | Tsuji |
| 5,909,642 A | 6/1999 | Suzuki |
| 6,041,081 A | 3/2000 | O et al. |
| 6,181,181 B1 | 1/2001 | Tsukahara et al. |

FOREIGN PATENT DOCUMENTS

| JP | 9-294089 | 11/1997 |
| JP | 11-186852 | 7/1999 |
| JP | 11-225102 | 8/1999 |
| JP | 2000-0022449 A | 1/2000 |
| JP | 2000-183764 | 6/2000 |
| JP | 2001-24714 | 1/2001 |
| WO | 00/39920 A1 | 7/2000 |

*Primary Examiner*—Duc M. Nguyen
*Assistant Examiner*—Michael Thier
(74) *Attorney, Agent, or Firm*—Arent Fox PLLC.

(57) ABSTRACT

An RF circuit (131–138) satisfies $Pnoise+NF+G \leq Plim+sW$ ($0 \leq s \leq 4$) at an edge of a guard band with respect to a required transmission level PAll, an upper tolerance level of out-of-band noise Plim, a guard bandwidth W, and a noise level Pnoise, where NF is a noise figure and G is a gain. An IF circuit (121–123) satisfies $PAll \leq Pin+G$, where PIF is an output level of a BPF (123). Out-of-band noise levels are reduced to Pnoise by the steep BPF (123). The RF circuit (131–138) is structured so that noise from a local oscillator circuit (134) does not surpass noise from the IF circuit (121–123). Reductions in power consumption are thus realized in addition to guard bandwidth reductions, because of being able to eliminate out-of-band noise from an amplifier (138) using a low-loss filter (140) having an attenuation slope s.

8 Claims, 8 Drawing Sheets

SIGNAL GENERATION DEVICE

CROSS-REFERENCE TO RELATED APPLICATION

This application is a National Stage entry of International Application No. PCT/JP02/01964, filed Mar. 4, 2002, the entire specification claims and drawings of which are incorporated herewith by reference.

TECHNICAL FIELD

The present invention relates to signal generation devices, and particularly to technologies for ameliorating out-of-band noise characteristics and improving power efficiency.

BACKGROUND ART

To prevent jamming emissions outside a radio frequency band assigned to a mobile communication system, conventional wireless transmission devices generally pass output signals from a final amplifier through a bandpass filter (BPF) to reduce spurious and unwanted emissions outside a management band to acceptable levels.

Figure 7:
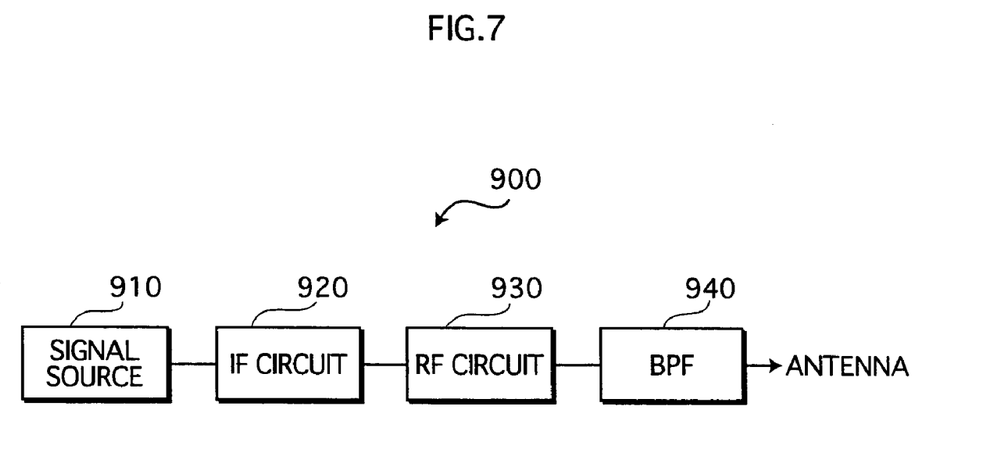
FIG. 7 is a block diagram showing the fundamental structure of a conventional signal generation device.

FIG. 7 is a block diagram showing an exemplary structure of a signal generation device applied in a conventional wireless transmission device.

In a conventional signal generation device 900, an intermediate frequency (IF) circuit 920 firstly generates a modulation signal for an intermediate frequency band that is modulated using a source signal supplied from signal source 910. IF circuit 920 then generates an IF signal from which spurious and unwanted emissions have been suppressed by passing the modulation signal through a surface acoustic wave (SAW) filter having steep out-of-band frequency/attenuation characteristics (hereinafter "attenuation slope"), and outputs the IF signal to a radio frequency (RF) circuit 930.

RF circuit 930 frequency converts the IF signal to a signal for a transmission frequency band, and generates an RF signal by amplifying this signal to a transmission level.

A BPF 940, which is used to eliminate spurious emissions, generates a transmission signal by suppressing spurious and unwanted emissions from the RF signal.

Figure 8:
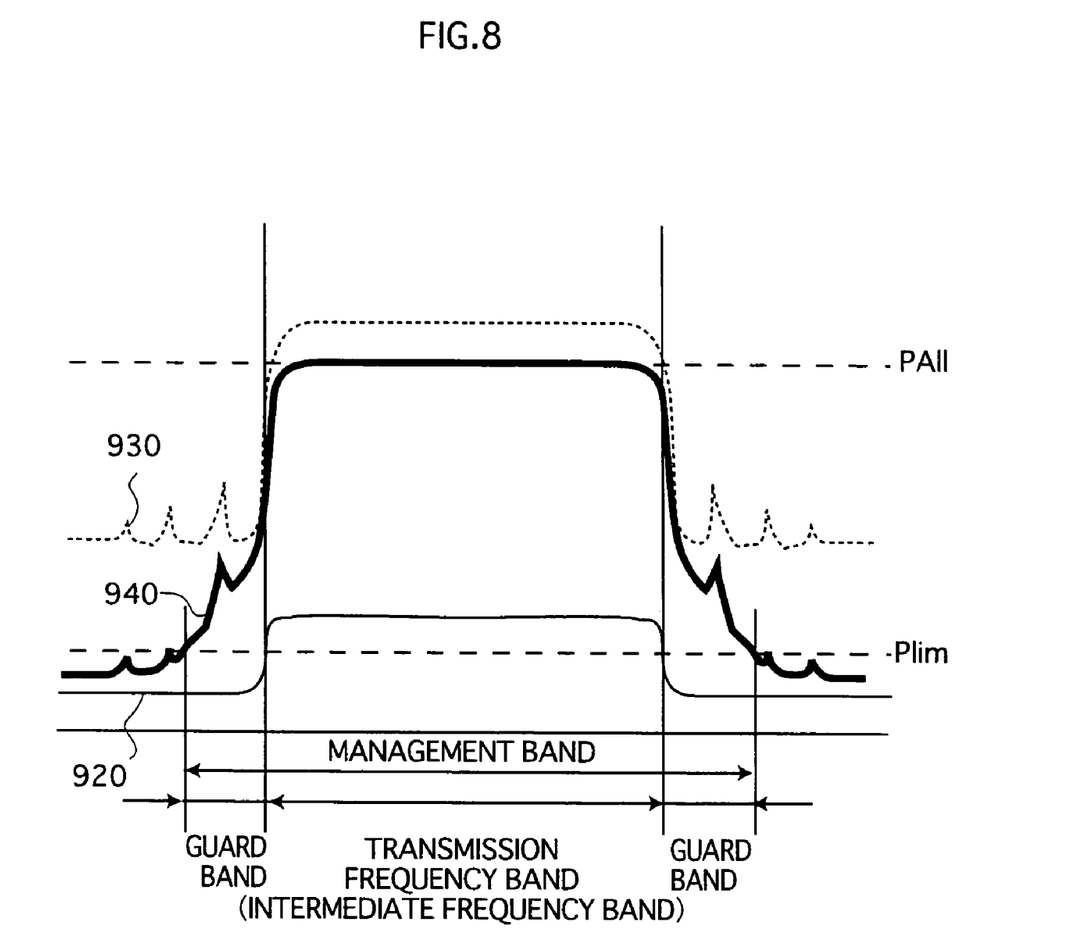
FIG. 8 is a graph showing conceptually the frequency/output level characteristics of signals outputted by various components in the conventional signal generation device.

FIG. 8 is a graph showing conceptually the frequency/output level characteristics of output signals from the various components in signal generation unit 900. Signal level and frequency are marked respectively on the vertical and horizontal axes. The curves show the output signals of components in FIG. 7 marked by the same reference signs. The transmission frequency band and intermediate frequency band are normalized on the same relative frequency axis.

Curve 920 shows the output level characteristics of IF circuit 920. The noise level of output signals from IF circuit 920 is steeply attenuated outside the intermediate frequency band as a result of being passed through the SAW filter.

Curve 930 shows the output level characteristics of RF circuit 930. RF circuit 930 amplifies the IF signal sufficiently to surpass a transmission signal level PAll [dBm], although out-of-band (OOB) noise included in the IF signal is at the same time also amplified above an upper tolerance level Plim [dBm/Hz]. Moreover, spurious and unwanted emissions that surpass the amplified OOB noise occur as a result of local spurious signals, intermodulation distortion, and the like.

Curve 940 shows the output level characteristics of BPF 940. The filter used in BPF 940 has a gentler attenuation slope than the SAW filter. Essentially, it is desirable to use a BPF having as steep an attenuation slope as possible in order to reduce the effective range of OOB noise.

However, because in-band attenuation increases as the gradient of the BPF attenuation slope becomes steeper, extremely large outputs are required of RF circuit 930 when using a BPF having too steep an attenuation slope. Also, since the size of BPFs increase proportionate to the steepness of the attenuation slope, a BPF having a reasonably gentle attenuation slope is used in order to achieve device miniaturization.

Noise is attenuated to levels at or below Plim [dBm/Hz] outside of the management band, which includes the guard bands on either side of the transmission frequency band, effectively reducing the output of BPF 940 to PAll [dBm].

Guard bands are conventionally applied as frequency bands not assigned to any mobile communication systems, in order to prevent interference between systems using adjacent frequency bands.

However, a problem with wireless transmission devices using conventional signal generation devices is that they cannot prevent interference in the case of mobile communication systems requiring narrow guard bands.

In particular, securing sufficiently wide guard bands between assigned frequency bands with current systems operating over numerous frequency bands has become difficult due to the tightening of frequency band resources, and has in fact lead to "down" signals transmitted from Personal Handyphone System (PHS) base stations interfering with International Mobile Telecommunications (IMT) 2000 systems employing a Code Division Multiple Access (CDMA) format.

Also, because BPFs in wireless transmission devices using the above conventional signal generation devices also attenuate signals for the transmission frequency band, expensive amplifier components are needed to produce large outputs that compensate for the attenuated amount, thus thwarting device miniaturization and cost-cutting efforts. Moreover, boosting the output of amplifier components requires increased power consumption, which raises electricity and other device operating costs.

With wireless transmission devices used in wireless base stations, in particular, mechanical BPFs are employed to place band restrictions on transmission signals requiring large amounts of power. These mechanical BPFs, being large, heavy and expensive, also stand in the way of device miniaturization and cost-cutting efforts.

Even with mobile telephones and other wireless transmission devices having low transmission signal levels, signals outputted from the final amplifier are generally passed through a BPF to reduce OOB noise before being transmitted.

As such, even if compact, lightweight BPFs with steep frequency band attenuation characteristics are used, expensive amplifier components having large outputs are still needed to compensate for the attenuated amount of in-band signals, thus preventing device cost reductions. Moreover, user convenience is adversely affected by the shortening of battery life resulting from the increased power consumption.

DISCLOSURE OF THE INVENTION

To resolve the above issues, the present invention aims to provide a signal generation device that reduces power consumption in obtaining a predetermined transmission level, in addition to ameliorating out-of-band (OOB) noise characteristics.

The object of the present invention is achieved by a signal generation device that includes: an object signal generation unit operable to generate, according to a source signal, an object signal so that out-of-band noise therein is reduced to Pnoise [dBm/Hz]; and a radio frequency unit operable to frequency convert or modulate the object signal by mixing with a local signal, and to generate a radio frequency signal for a transmission frequency band by amplifying the frequency converted or modulated signal to a predetermined level. Here, if NF [dB] and G [dB] are respectively a noise figure and a gain of the radio frequency unit, and Pin [dBm] is a signal level of the object signal, the radio frequency unit is structured so that (NF+G) is less than or equal to a first predetermined value, and the object signal generation unit is structured so that Pin is greater than or equal to a second predetermined value.

According to this structure, OOB noise in the output of the RF unit is reduced because of a necessary transmission level in the output of the RF unit being assured as a result of raising the output level of the object signal generation unit, in addition to suppressing the amplification factor of noise in the RF unit to a low level. Consequently, the output required of the power amplifier is reduced because of being able to eliminate the OOB noise using a low-loss filter having a gentler attenuation slope than the prior art. It is thus possible to reduce the device's power consumption in addition to reducing device costs because of being able to use a low-cost power amplifier. Also, the filter having the gentle attenuation slope, being compact and inexpensive, contributes to device miniaturization and cost cutting. Moreover, guard bandwidth reductions are realized if a filter having a steep attenuation slope is used in the object signal generation unit to eliminate OOB noise from the output signal.

Here, the radio frequency unit may be structured to satisfy Pnoise+NF+G≦Plim+sW at an edge of a guard band with respect to a coefficient s, and the object signal generation unit may be structured to satisfy PAll≦Pin+G, where PAll [dBm] is a transmission signal level for wireless transmission of the radio signal, Plim [dBm/Hz] is the upper tolerance level of out-of-band noise, W [MHz] is a width of the guard band, and 0≦s [dB/MHz]≦4. Also, Pnoise may be a thermal noise level kT [dBm/Hz].

According to these structures, it is possible to eliminate OOB noise deriving from thermal noise using a BPF having an attenuation slope of 0 to 4 degrees, which is gentler than the prior art, because of the OOB noise deriving from thermal noise being suppressed to a lower level than the prior art at an edge of the guard band, even when a predetermined signal level is achieved in the output of the RF unit. Because of the BPF being able to reduce power amp output due to the in-band attenuation also being low, power consumption reductions are realized, and notably, mechanical BPFs are no longer required when application is in wireless base stations.

Also, because OOB noise is steeply attenuated in the object signal generation unit using a SAW filter or the like, frequency characteristics are ameliorated and the required guard bandwidth is reduced.

Any intermodulation distortion, spurious noise, or the like exceeding an upper tolerance level of OOB noise that remains in the output of the RF unit can be eliminated by inserting an multilayer inductance-capacitance (LC) filter or the like that is smaller, lighter, and less expensive than a mechanical BPF between the RF unit and an antenna.

Here, if Pn [dBc/Hz] is a ratio of signal level to out-of-band noise level, the radio frequency unit may be structured to satisfy Plim≧PAll−Pn. Also, the radio frequency unit may include a bandpass filter, and mix the object signal with a signal that results from passing a frequency component of the local signal through the bandpass filter, and if s2 [dB/MHz] is an attenuation slope of the bandpass filter, the radio frequency filter may be structured to satisfy Plim≧PAll−Pn−s2W.

Because spurious noise and the like generated from the local oscillation unit does not surpass noise deriving from thermal noise according to these structures, there is no particular need to provide a filter for eliminating OOB noise deriving from the local oscillation unit.

Here, the radio frequency unit may use an image rejection mixer in the mixing.

Because a high-output mixed signal is extracted from an image rejection mixer according to this structure, it is possible to use a low-cost amplifier having a small gain in the power amplifier. Also, the peak noise level value can be suppressed to a low level because of the phases of the noise components not being matched.

Here, the radio frequency unit may include a predistortion subunit operable to compensate the object signal so as to reduce intermodulation distortion occurring in the radio frequency signal as a result of the mixing and the amplification.

According to this structure, it is possible, in particular, to reduce intermodulation distortion generated in the RF signal.

The object of the present invention may also be achieved by a wireless transmission device that performs wireless transmission of a radio frequency signal generated by a signal generation device as described above.

Many specific effects are achieved in a wireless transmission device as a result of the effects of signal generation device as described above being fully exhibited, these including device miniaturization, cost reductions, power consumption reductions, amelioration of out-of-band noise characteristics, and improvements in the usage efficiency of frequency band resources due to guard bandwidth reductions.

BEST MODE FOR CARRYING OUT THE INVENTION

Embodiment 1

A signal generation device in a first embodiment includes an intermediate frequency (IF) circuit and a radio frequency (RF) circuit. The IF circuit outputs an IF signal whose out-of-band (OOB) noise level has been reduced to a predetermined level (e.g. a thermal noise level), at a higher signal level than the prior art. The RF circuit, which has a smaller gain than the prior art, frequency converts the IF signal by mixing the IF signal with a local signal to generate an RF signal.

When the RF signal is for wireless transmission, the signal generation device, in addition to generating the RF signal at a signal level at or above that required by a transmission signal for supply to an antenna, is structured either so that the OOB noise level of the RF signal does not exceed an upper tolerance level of OOB noise in the transmission signal, or so that this upper limit is exceeded by less than the prior art.

Figure 1:
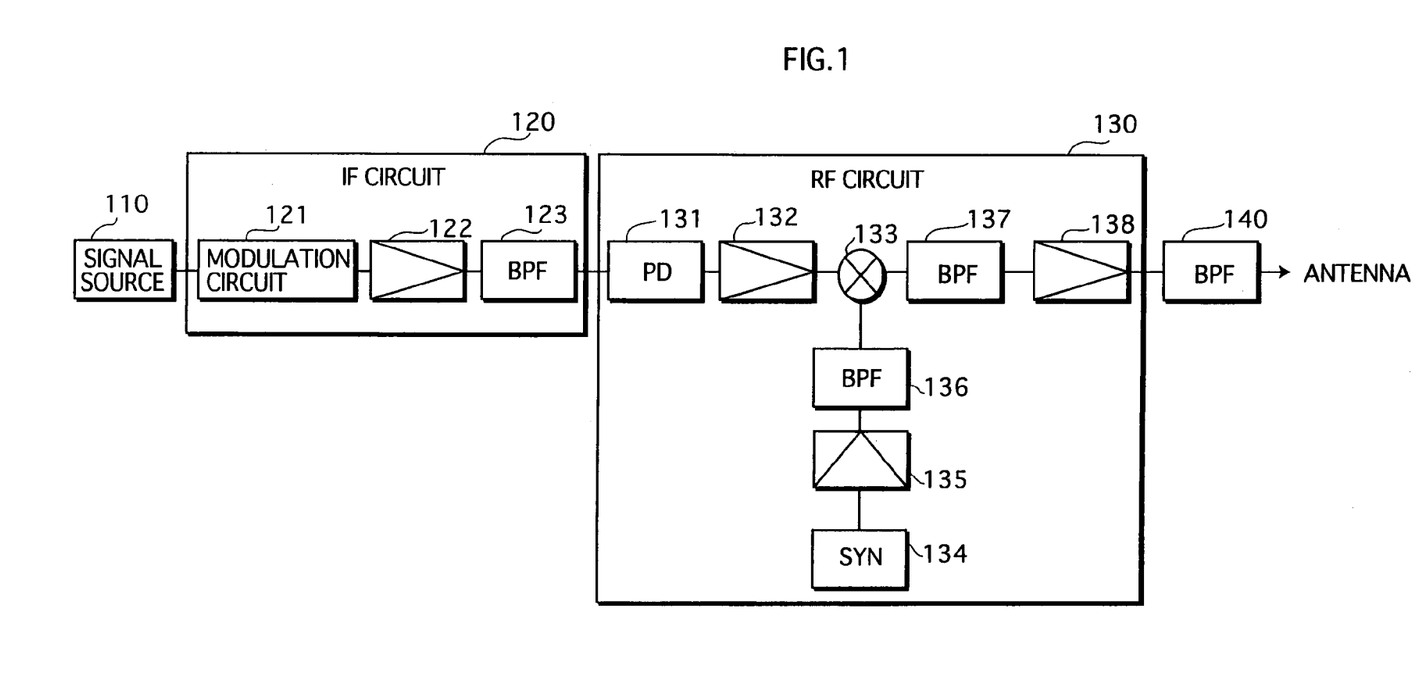
FIG. 1 is a block diagram showing a structure of a signal generation device in an embodiment 1.

FIG. 1 is a block diagram showing a structure of a signal generation device in embodiment 1.

Signal generation device 100 is constituted from a signal source 110, an IF circuit 120, and an RF circuit 130. IF circuit 120 is constituted to include a modulation circuit 121, an amplifier 122, and a bandpass filter (BPF) 123. RF circuit 130 is constituted to include a predistortion (PD) circuit 131, an amplifier 132, a mixer 133, a local oscillator (LO) circuit 134, an amplifier 135, BPFs 136 and 137, and an amplifier 138.

It should be noted that BPF 140, which is not included in signal generation device 100, is appended as part of a common structure in the event of device 100 being applied in a wireless transmission device and output signals from device 100 being for wireless transmission.

Signal source 110 generates a source signal in a baseband, and outputs the generated signal to IF circuit 120.

In IF circuit 120, modulation circuit 121 generates a modulation signal for the intermediate frequency band that is modulated by the source signal, amplifier 122 amplifies the modulation signal, and BPF 123 generates an IF signal by reducing the OOB noise in the amplified modulation signal to approximately a thermal noise level, and outputs the generated IF signal to the RF signal. BPF 123 is a surface acoustic wave (SAW) filter.

In RF circuit 130, PD circuit 131 mixes a harmonic signal for reducing intermodulation distortion generated by mixer 133 and amplifier 138 in the inputted IF signal, and amplifier 132 amplifies the resultant IF signal and outputs the amplified signal to mixer 133. Since predistortion technology is well known, description is omitted here.

On the other hand, LO circuit 134, which is a frequency synthesizer, for example, generates a local signal and outputs the generated signal to amplifier 135. BPF 136 outputs the local signal amplified by amplifier 135 to mixer 133 after attenuating components (e.g. local spurious noise) of the local signal other than the frequency component from the local signal.

Mixer 133, which is realized using an attenuated passive component (e.g. double balanced mixer, image rejection mixer), frequency converts the IF signal to a transmission frequency band signal by mixing the local signal with the IF signal in which the harmonic signal has been mixed. BPF 137 attenuates the harmonic component of the frequency-converted signal, and amplifier 138 amplifies the output signal to a predetermined level to generate an RF signal.

When the generated RF signal is for wireless transmission via BPF 140, signal generation device 100 is structured so that the noise figure and gain of RF circuit 130 and the output signal level of IF circuit 120 satisfy values described below, with respect to both a signal level required by a transmission signal for supply to an antenna and an upper tolerance level of OOB noise.

Figure 2:
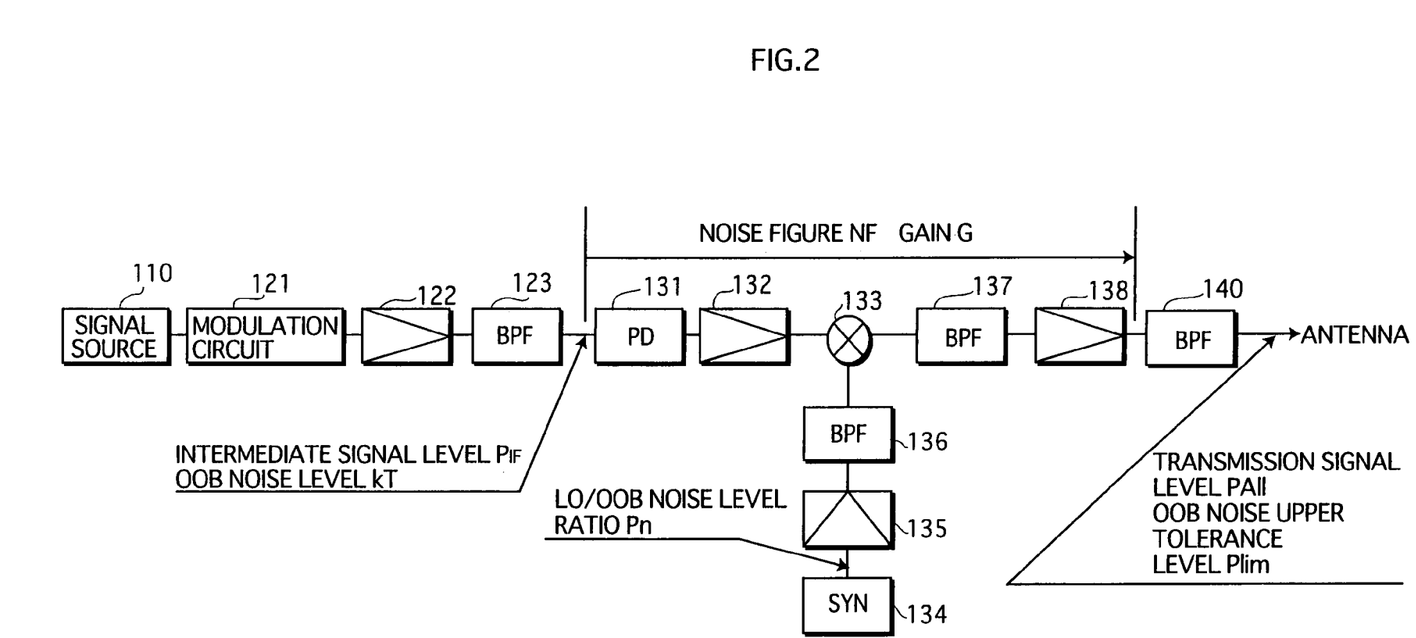
FIG. 2 shows signal levels, noise levels, noise figures, and gains of various components in the signal generation device.

FIG. 2 shows signal levels, noise levels, noise figures, and gains for the various components in signal generation device 100. For clarity of description, the boxes in FIG. 1 indicating the ranges of IF circuit 120 and RF circuit 130 have been removed from FIG. 2.

The output signal of BPF 140 equates to a transmission signal for supply to an antenna. The signal level required by this transmission signal is PA11 [dBm], and the upper tolerance level of OOB noise is Plim [dBm/Hz].

RF circuit 130 is structured so that a noise figure NF [dB] and a gain G [dB] of the signal path from PD circuit 131 to amplifier 138 at an edge of the guard band satisfy $$kT+NF+G \leq Plim+sW$$

with respect to Plim [dBm/Hz], thermal noise level kT [dBm/Hz], and guard bandwidth W [MHz], where s is a coefficient such that $0 \leq s \leq 4$.

More specifically, a structure satisfying this relational expression can be realized by:

(1) using an attenuated passive component (e.g. double balanced mixer) in mixer 133, so as to provide high output and reduce G;

(2) using an image rejection mixer in mixer 133 for extracting a higher output than when a simple mixer is used in mixer 133, thereby reducing the gain of amplifier 138 and thus G;

(3) using a low-noise amplifier in amplifier 132 to reduce NF;

(4) suppressing increases in NF by inputting IF signals directly from IF circuit 120 to RF circuit 130 without passing the IF signals through an attenuator for matching signal levels; and (5) providing PD circuit 131 to lower distortion, which provides high output and reduces G.

Nor is necessary to apply all of these structures. The present invention also includes cases in which the above relational expression is satisfied by applying one or more of these structures. The same applies to following sections of the description in which structures for satisfying relational expressions are enumerated.

IF circuit 120 is structured so that an IF signal level PIF [dBm] outputted by IF circuit 120 satisfies $$PA11 \leq PIF+G$$

With respect to PA11 [dBm] and G [dB], and the OOB noise level is a thermal noise level kT [dBm/Hz] where T is the absolute temperature of the RF circuit and k is a constant.

More specifically, a structure satisfying this relational expression can be realized by:

(1) using amplifier 122 having a necessary gain; and (2) using a SAW filter in BPF 123.

If Pn [dBc/Hz] is a signal level to OOB noise level ratio of the local signal, and s2 [dB/MHz] is the attenuation slope of BPF 136, RF circuit 130 is structured to satisfy $$Plim \geq PA11-Pn-s2W$$

More specifically, a structure satisfying this relational expression can be realized by:

(1) using a high-precision frequency synthesizer in LO circuit 134 to generate a local signal having a high signal level to OOB noise level ratio; and
(2) using BPF 136 to eliminate OOB noise in the local signal.

RF circuit 130 may be structured to satisfy $$Plim \geq PAll-Pn$$

More specifically, a structure satisfying this relational expression can be realized by using an even higher precision frequency synthesizer in LO circuit 134 to generate a local signal having a high signal level to OOB noise level ratio.

Figure 3:
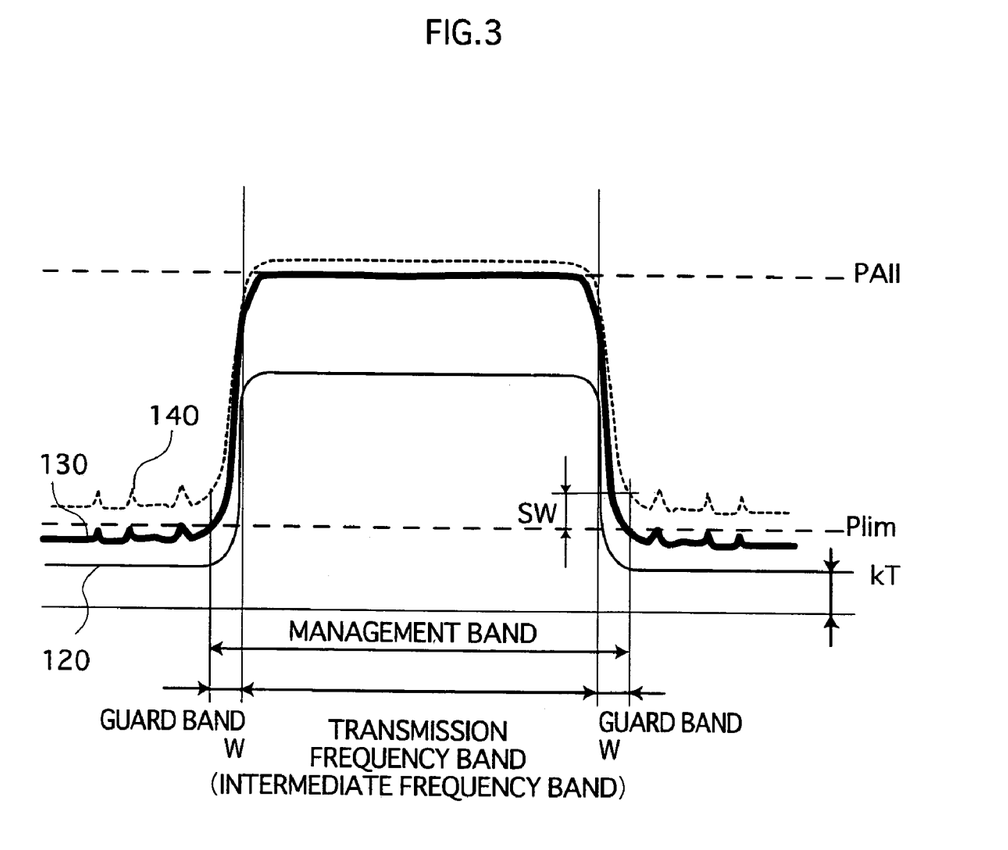
FIG. 3 is a graph showing conceptually the frequency/output level characteristics of signals outputted by various components in the signal generation device.

FIG. 3 is a graph showing conceptually the frequency/output level characteristics of the various components in signal generation device 100 having the above structure. The curves show the output signals of components in FIG. 1 marked by the same reference signs. The intermediate frequency band and transmission frequency band are normalized on the same relative frequency axis.

Curve 120 shows the output level characteristics of IF circuit 120. The signal generated in IF circuit 120 is amplified by amplifier 122 to a higher level than the prior art, so as to allow RF circuit 130, which has a smaller gain than the prior art, to amplify the IF signal to a predetermined level. The IF signal is outputted from IF circuit 120 after having noise levels outside the intermediate frequency band steeply suppressed to a thermal noise level by BPF 123 using a SAW filter.

Curve 130 shows the output level characteristics of RF circuit 130. Since RF circuit 130, which amplifies the IF signal to a predetermined level, is structured to satisfy $$kT+NF+G \leq Plim+sW$$

at the guard band edge, it is possible to suppress the excess ratio sW (i.e. amount by which the upper tolerance level of OOB noise deriving from thermal noise is exceeded) to the upper tolerance level using a BPF having an attenuation ratio of sW [dB] by detuning the guard bandwidth W [MHz]; that is, using a BPF having an attenuation slope s [dB/MHz] ($0 \leq s \leq 4$).

Because this attenuation slope is sufficiently gentle in comparison with the attenuation slope of conventional BPFs, in-band attenuation is also reduced below the prior art. RF circuit 130 can be realized using an inductance-capacitance (LC) filter or the like if the BPF has such an attenuation slope, thus making the use of expensive mechanical filters unnecessary, particularly when signal generation device 100 is applied in a wireless transmission device used by a wireless base station.

Furthermore, the OOB frequency/attenuation characteristics are steep because of the IF signal being passed through the SAW filter BPF 123, and the required guard band is narrow. Also, since RF circuit 130 is structured to satisfy $$Plim \geq PAll-Pn-s2W$$

spurious noise and the like in the local signal does not surpass noise deriving from thermal noise. Consequently, filters for eliminating noise deriving from the local signal are not required after amplifier 138.

Furthermore, intermodulation distortion is kept low as a result of PD circuit 131 compensating the IF signal.

As described above, with a signal generation device of the present invention, OOB noise deriving from thermal noise can be eliminated using a BPF having a gentler attenuation slope than the prior art. This is because OOB noise deriving from thermal noise is kept to a lower level than the prior art at the guard band edge, even when the output of amplifier 138 achieves a sufficient signal level. Power consumption reductions are realized because of the low in-band attenuation of such BPFs, and the use of mechanical BPFs in wireless base stations in particular is unnecessary.

If intermodulation distortion exceeding the upper tolerance level of OOB noise remains in the output of RF circuit 130, a filter that drops the noise level only at these frequency points may be provided between amplifier 138 and the antenna. This filter can be realized using a multilayer LC filter or the like. There is no particular need to use mechanical BPFs.

The present invention is, of course, not limited to embodiment 1. The following cases are also included in the present invention.

PD circuit 131 may be omitted by using amplifier 138 in characteristic regions exhibiting excellent linearity. Structures that do not have PD circuit 131 are included in the present invention.

BPF 136 may be omitted by using high-precision LO circuit 134 to generate local signals having a high signal level to OOB noise ratio. Structures that do not have BPF 136 are included in the present invention.

In structures in which coefficient s is set to "0", filters for removing thermal noise need not be provided after RF circuit 130, and output signals from amplifier 138 can be sent directly to the antenna.

Embodiment 2

A signal generation device in an embodiment 2 includes a baseband circuit and a radio frequency (RF) circuit. The baseband circuit outputs a baseband signal whose out-of-band (OOB) noise level has been reduced to a predetermined level (e.g. a thermal noise level), at a higher signal level than the prior art. The RF circuit, which has a smaller gain than the prior art, generates a modulated RF signal by mixing the baseband signal with a local signal.

When the RF signal is for wireless transmission, the signal generation device, in addition to generating the RF signal at a signal level at or above that required by a transmission signal for supply to an antenna, is structured either so that the OOB noise level of the RF signal does not exceed an upper tolerance level of OOB noise in the transmission signal, or so that this upper limit is exceeded by less than the prior art.

Figure 4:
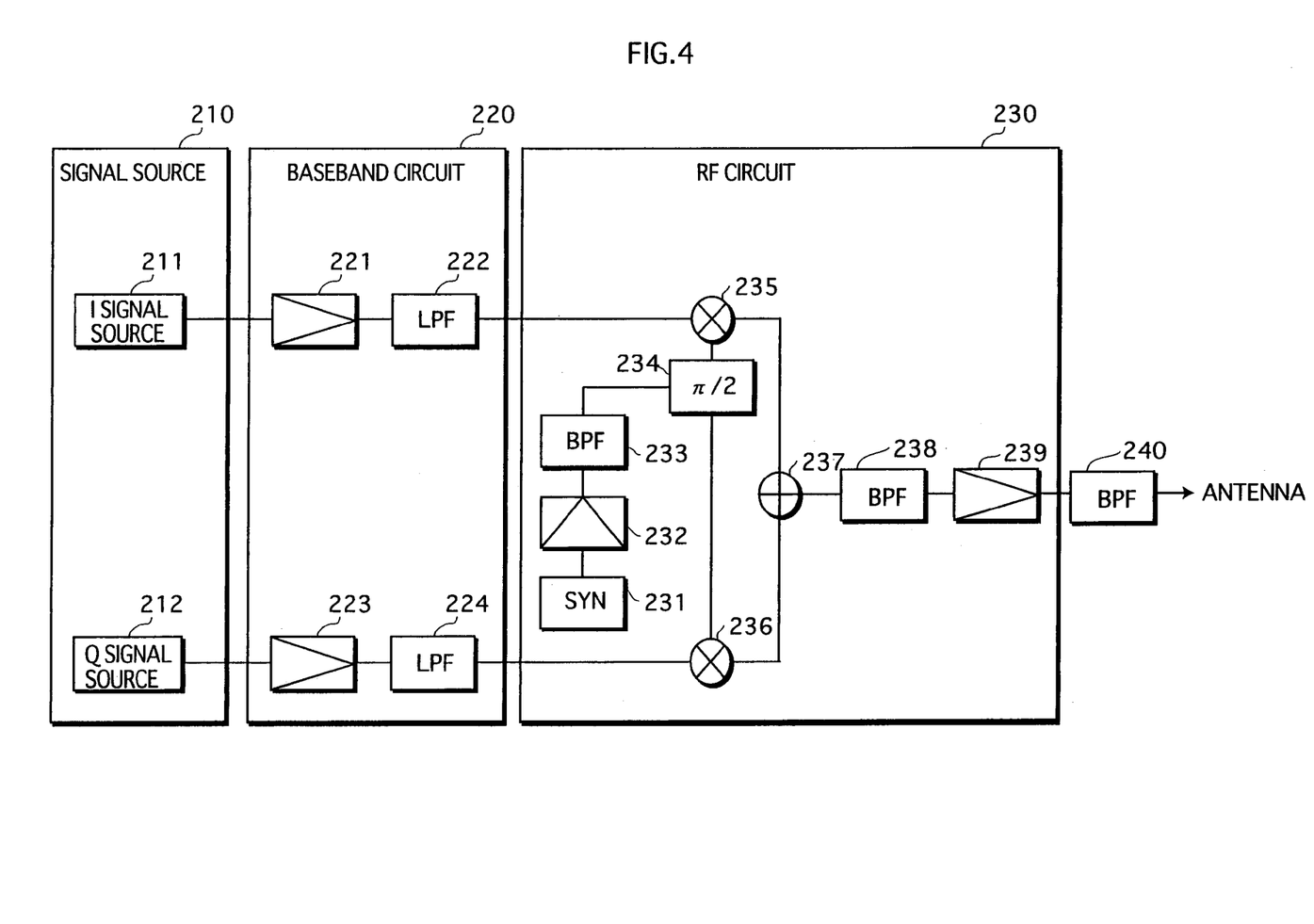
FIG. 4 is a block diagram showing a structure of a signal generation device in an embodiment 2.

FIG. 4 is a lock diagram showing a structure of a signal generation device in embodiment 2.

Signal generation device 200 is constituted from a signal source 210, a baseband circuit 220, and an RF circuit 230. Signal source 210 is constituted to include an I signal source 211 and a Q signal source 212. Baseband circuit 220 is constituted to include an amplifier 221, a low pass filter (LPF) 222, an amplifier 223, and a LPF 224. RF circuit 230 is constituted to include a local oscillator (LO) circuit 231, an amplifier 232, a bandpass filter (BPF) 233, a phase shifter 234, mixers 235 and 236, a synthesizer 237, a BPF 238, and an amplifier 239.

It should be noted that BPF 240, which is not included in signal generation device 200, is appended as part of a common structure in the event of device 200 being applied in a wireless transmission device and output signals from device 200 being for wireless transmission.

The I and Q signal sources in signal source 210 generate source signals in a baseband, and output the generated signals to baseband circuit 220.

In baseband circuit 220, amplifiers 221 and 223 amplify respectively the I and Q source signals, and LPFs 222 and 224 reduce respectively the OOB noise in the amplified I and Q source signals to approximately a thermal noise level, and output the resultant I and Q signals to RF circuit 230. LPFs 222 and 224 are surface acoustic wave (SAW) filters.

In RF circuit 230, LO circuit 231, which is for example a frequency synthesizer, generates a local signal, which is then outputted to amplifier 232. BPF 233 attenuates components (e.g. local spurious noise) of the local signal other than the frequency component from the local signal amplified by amplifier 232, and outputs the resultant signal to phase shifter 234. Phase shifter 234 generates I and Q local signals having a phase difference of $\pi/2$, by either changing a phase of the inputted signal or allowing the inputted signal to pass through unchanged, and outputs the generated I and Q local signals respectively to mixers 235 and 236.

Mixer 235, which is realized using an attenuated passive component (e.g. double balanced mixer, image rejection mixer), generates an I modulation signal by mixing the inputted I signal and I local signal. Mixer 236, which is realized in the same way as mixer 235, generates a Q modulation signal by mixing the inputted Q signal and Q local signal.

Synthesizer 237 sums the I and Q modulation signals, and outputs the resultant signal to BPF 238. BPF 238 attenuates the high frequency component of the summed signal, and amplifier 239 amplifies the output signal of BPF 238 to a predetermined level to generate an RF signal.

When the generated RF signal is for wireless transmission via BPF 240, signal generation device 200 is structured so that the noise figure and gain of RF circuit 230 and the output signal level of baseband circuit 220 satisfy values described below, with respect to both a signal level required by a transmission signal for supply to an antenna and an upper tolerance level of OOB noise.

Figure 5:
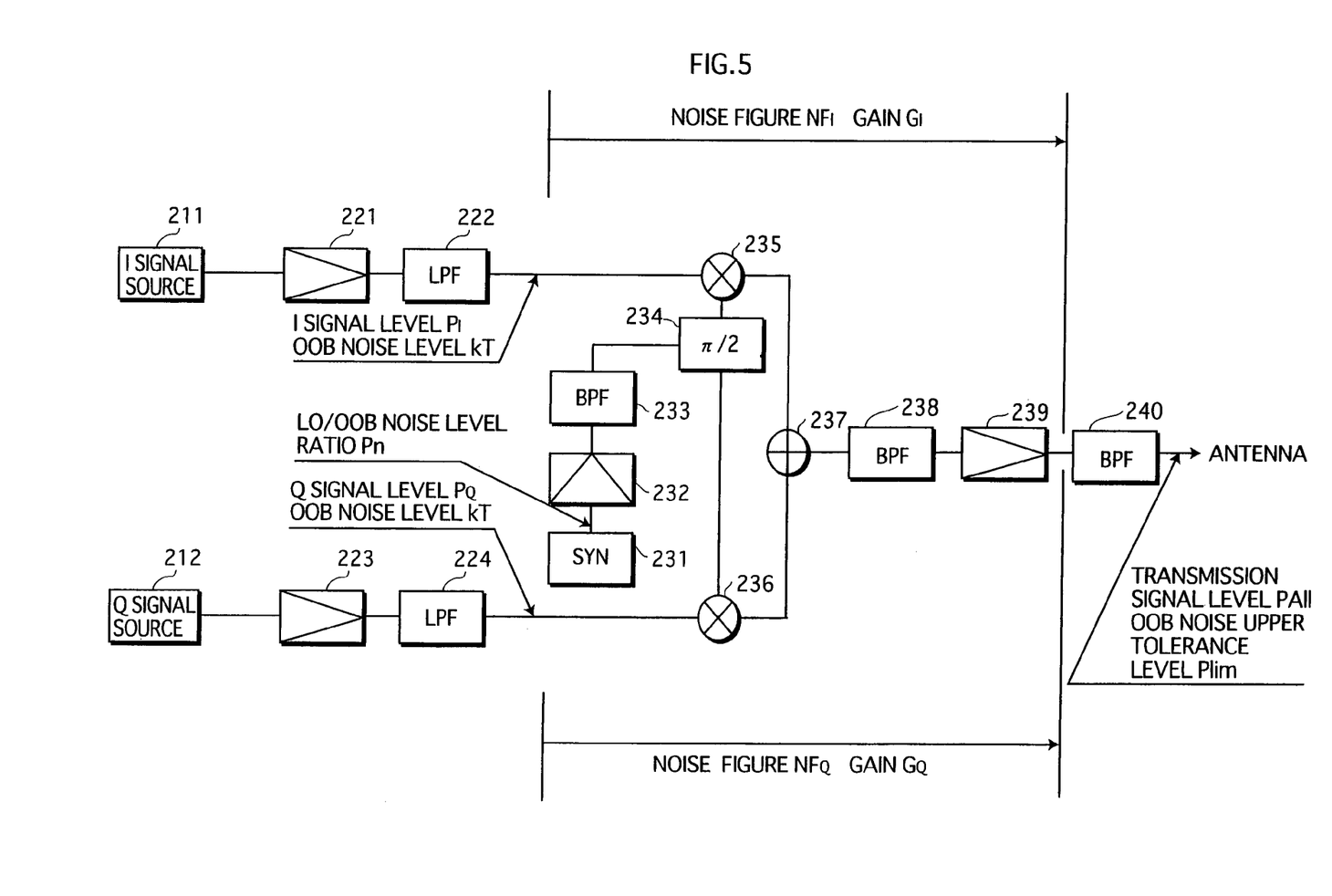
FIG. 5 shows signal levels, noise levels, noise figures, and gains of various components in the signal generation device.

FIG. 5 shows signal levels, noise levels, noise figures, and gains for the various components in signal generation device 200. For clarity of description, the boxes in FIG. 4 indicating the ranges of baseband circuit 220 and RF circuit 230 have been removed from FIG. 5.

The output signal of BPF 240 equates to a transmission signal for supply to an antenna. The signal level required by this transmission signal is PAll [dBm], and the upper tolerance level of OOB noise is Plim [dBm/Hz].

RF circuit 230 is structured so that a noise figure NFI [dB] and a gain GI [dB] of the signal path from mixer 235 to amplifier 239 at an edge of the guard band satisfy $$kT+NFI+GI \leq Plim+sW$$

with respect to Plim [dBm/Hz], thermal noise level kT [dBm/Hz], and guard bandwidth W [MHz], where s is a coefficient such that $0 \leq s \leq 4$.

Likewise, RF circuit 230 is structured so that a noise figure NFQ [dB] and a gain GQ [dB] of the signal path from mixer 236 to amplifier 239 at an edge of the guard band satisfy $$kT+NFQ+GQ \leq Plim+sW$$

where s is a coefficient such that $0 \leq s \leq 4$.

More specifically, a structure satisfying these relational expressions can be realized by:

(1) using an attenuated passive component (e.g. double balanced mixer) in mixers 235 and 236, so as to provide high output and reduce G;

(2) using an image rejection mixer in mixers 235 and 236 for extracting a higher output than when a simple mixer is used in mixers 235 and 236, thereby reducing the gain of amplifier 239 and thus G; and (3) suppressing increases in NF by inputting the I and Q signals directly from baseband circuit 220 to RF circuit 230 without passing the I and Q signals through an attenuator for matching signal levels;

Baseband circuit 220 is structured so that an I signal level PI [dBm] outputted by baseband circuit 220 satisfies $$PAll \leq PI+G$$

with respect to PAll [dBm] and G [dB], and the OOB noise level is a thermal noise level kT [dBm/Hz].

Likewise, baseband circuit 220 is structured so that a Q signal level PQ [dBm] outputted by baseband circuit 220 satisfies $$PAll \leq PQ+G$$

and the OOB noise level is a thermal noise level kT [dBm/Hz]

More specifically, a structure satisfying this relational expression can be realized by:

(1) using amplifiers 221 and 223 having a necessary gain; and (2) using a SAW filter in LPFs 222 and 224.

If Pn [dBc/Hz] is a signal level to OOB noise level ratio of the local signal, and s2 [dB/MHz] is the attenuation slope of BPF 233, RF circuit 230 is structured to satisfy $$Plim \geq PAll-Pn-s2W$$

More specifically, a structure satisfying this relational expression can be realized by:

(1) using a high-precision frequency synthesizer in LO circuit 231 to generate a local signal having a high signal level to OOB noise level ratio; and (2) using BPF 233 to eliminate OOB noise in the local signal.

RF circuit 230 may be structured to satisfy $$Plim \geq PAll-Pn$$

More specifically, a structure satisfying this relational expression can be realized by using an even higher precision frequency synthesizer in LO circuit 231 to generate a local signal having a high signal level to OOB noise level ratio.

Figure 6A:
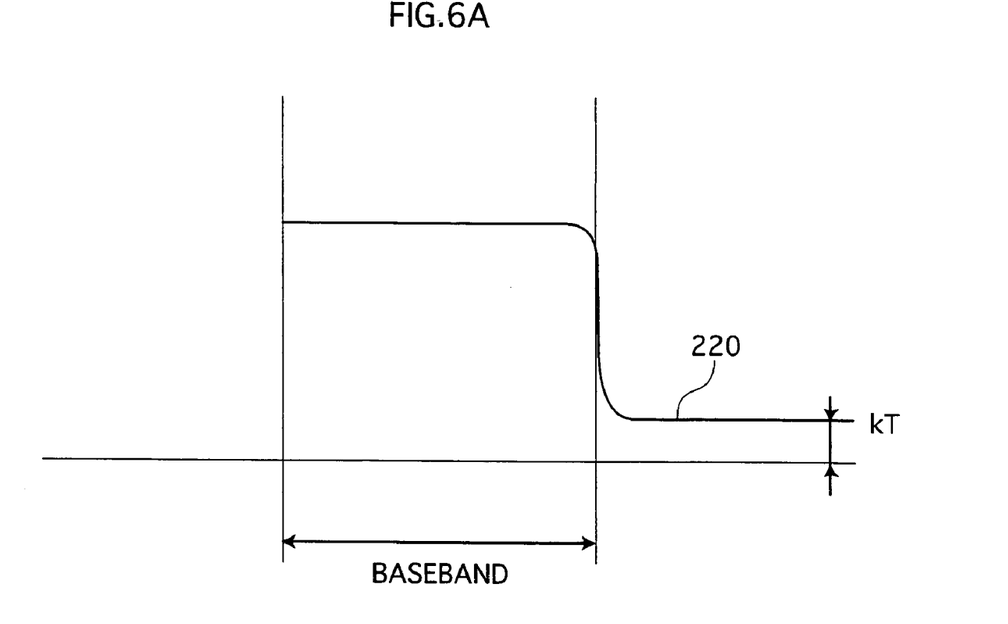
FIGS. 6A & 6B are graphs showing conceptually the frequency/output level characteristics of signals outputted by various components in the signal generation device.
Figure 6B:
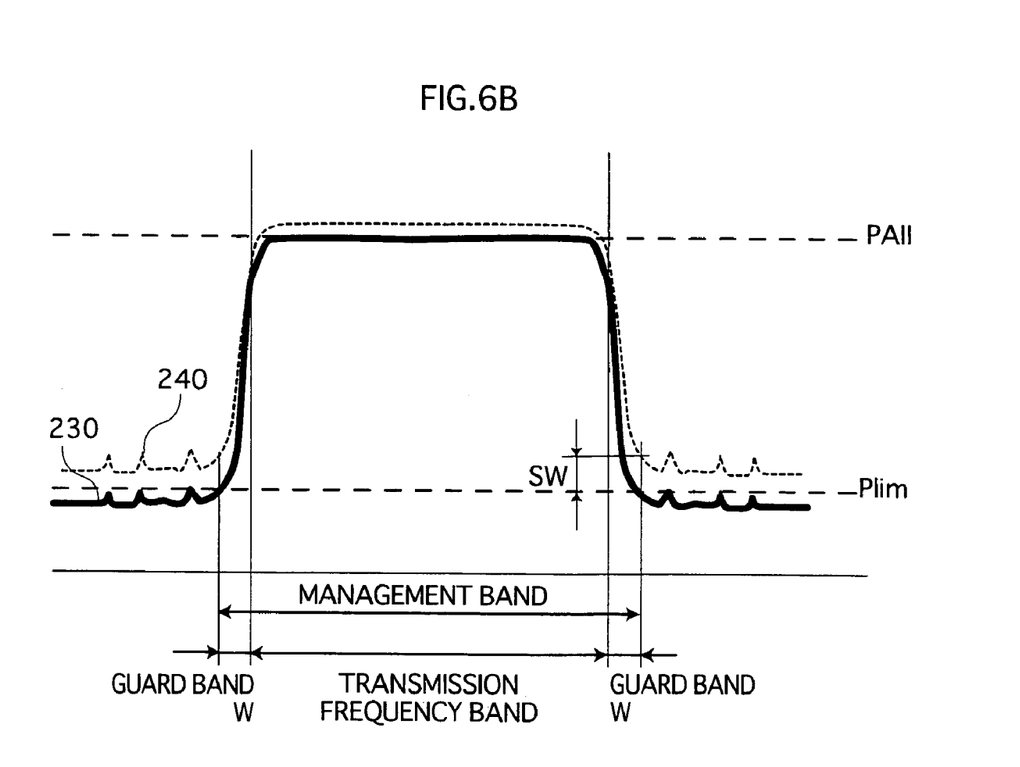

FIGS. 6A and 6B are graphs showing conceptually the frequency/output level characteristics of the various components in signal generation device 200 having the above structure. The curves show the output signals of components in FIG. 4 marked by the same reference signs.

Curve 220 in FIG. 6A shows the output level characteristics of the I and Q signals outputted from baseband circuit 220. The I and Q signals are amplified by amplifiers 221 and 223 to a higher level than the prior art, so as to allow RF circuit 230, which has a smaller gain than the prior art, to amplify the I and Q signals to a predetermined level. The amplified I and Q signals are then outputted from baseband circuit 220 after having noise levels outside the baseband steeply suppressed to a thermal noise level by LPFs 222 and 224 using SAW filters.

Here, the "baseband" is a band from direct current to a predetermined frequency, and "outside the baseband" refers to areas having a higher frequency than the predetermined level.

Curve 230 in FIG. 6B shows the output level characteristics of the RF signal outputted from RF circuit 230. Because the RF signal is generated by amplifying the local signal after the local signal has been modulated using the I and Q signals, noise deriving from thermal noise in the I and Q signals occurs on both sides of the transmission frequency band. Since RF circuit 230, which amplifies the I and Q signals to a predetermined level, is structured to satisfy $kT+NFI+GI \leq Plim+sW$, and $kT+NFQ+GQ \leq Plim+sW$ at the guard band edge, it is possible to suppress the excess ratio sW (i.e. amount by which the upper tolerance level of OOB noise deriving from thermal noise is exceeded) to the upper tolerance level using a BPF having an attenuation ratio of sW [dB] by detuning the guard bandwidth W [MHz]; that is, using a BPF having an attenuation slope s [dB/MHz] ($0 \leq s \leq 4$).

Because this attenuation slope is sufficiently gentle in comparison with the attenuation slope of conventional BPFs, in-band attenuation is also reduced below the prior art. RF circuit 230 can be realized using an inductance-capacitance (LC) filter or the like if the BPF has such an attenuation slope, thus making the use of expensive mechanical filters unnecessary, particularly when signal generation device 200 is applied in a wireless transmission device used by a wireless base station.

Furthermore, the OOB frequency/attenuation characteristics are steep because of the I and Q signals being passed through the SAW filter BPF 223, and the required guard band is narrow. Also, since RF circuit 230 is structured to satisfy $Plim \geq PAll-Pn-s2W$ spurious noise and the like in the local signal does not surpass noise deriving from thermal noise. Consequently, filters for eliminating noise deriving from the local signal are not required after amplifier 239.

As described above, with a signal generation device of the present invention, OOB noise deriving from thermal noise can be eliminated using a BPF having a gentler attenuation slope than the prior art. This is because OOB noise deriving from thermal noise is kept to a lower level than the prior art at the guard band edge, even when the output of amplifier 239 achieves a sufficient signal level. Power consumption reductions are realized because of the low in-band attenuation of such BPFs, and the use of mechanical BPFs in wireless base stations in particular is unnecessary.

If intermodulation distortion exceeding the upper tolerance level of OOB noise remains in the output of RF circuit 230, a filter that drops the noise level only at these frequency points may be provided between amplifier 239 and the antenna. This filter can be realized using a multilayer LC filter or the like. There is no particular need to use mechanical BPFs.

The present invention is, of course, not limited to embodiment 2. The following cases are also included in the present invention.

A predistortion (PD) circuit for attenuating intermodulation distortion generated in the RF signal from the mixing and amplification respectively by the mixers and amplifier 139 may be provided between LPF 222 and mixer 235 as well as between LPF 224 and mixer 236. Structures that have a PD circuit are included in the present invention.

BPF 233 may be omitted by using high-precision LO circuit 231 to generate local signals having a high signal level to OOB noise ratio. Structures that do not have BPF 233 are included in the present invention.

In structures in which coefficient s is set to "0", filters for removing thermal noise need not be provided after RF circuit 230, and output signals from amplifier 239 can be sent directly to the antenna.

INDUSTRIAL APPLICABILITY

A signal generation device pertaining to the present invention, which is applied in a wireless transmission device included in a wireless telephone base station, a wireless telephone, a wireless information terminal or the like structuring a mobile communication system, achieves device miniaturization, cost reductions, power consumption reductions, amelioration of out-of-band noise characteristics, and improvements in the usage efficiency of frequency band resources due to guard bandwidth reductions. Moreover, a signal generation device pertaining to the present invention, which is applied in a test signal generation device, achieves device miniaturization, cost reductions, power consumption reductions, and amelioration of out-of-band noise characteristics.

The invention claimed is:

1. A signal generation device for a transmission device, comprising:

an object signal generation unit operable to generate, according to a source signal, an object signal so that out-of-band noise therein is reduced to Pnoise [dBm/Hz]; and a radio frequency unit operable to frequency convert or modulate the object signal by mixing with a local signal, and to generate a radio frequency signal for a transmission frequency band by amplifying the frequency converted or modulated signal to a predetermined level; wherein if NF [dB] and G [dB] are respectively a noise figure and a gain of the radio frequency unit, and Pin [dBm] is a signal level of the object signal, the radio frequency unit is structured so that (NF+G) is less than or equal to a first predetermined value, and the object signal generation unit is structured so that Pin is greater than or equal to a second predetermined value.

2. The signal generation device of claim 1, wherein the radio frequency unit is structured to satisfy Pnoise+NF+G$\leq$Plim+sW at an edge of a guard band with respect to a coefficient s, and the object signal generation unit is structured to satisfy PAll$\leq$Pin+G, where PAll [dBm] is a transmission signal level for wireless transmission of the radio signal, Plim [dBm/Hz] is the upper tolerance level of out-of-band noise, W [MHz] is a width of the guard band, and $0 \leq s$ [dB/MHz] $\leq 4$.

3. The signal generation device as in one of claims 1 and 2, wherein Pnoise is a thermal noise level kT [dBm/Hz].

4. The signal generation device of claim 2, wherein if Pn [dBc/Hz] is a ratio of signal level to out-of-band noise level, the radio frequency unit is structured to satisfy Plim$\geq$PAll−Pn.

5. The signal generation device of claim 4, wherein
the radio frequency unit includes a bandpass filter, and
mixes the object signal with a signal that results from
passing a frequency component of the local signal
through the bandpass filter, and if s2 [dB/MHz] is an attenuation slope of the bandpass
filter, the radio frequency filter is structured to satisfy
Plim≧PAll−Pn−s2W.

6. The signal generation device as in claim 1, wherein the radio frequency unit uses an image rejection mixer in the mixing.

7. The signal generation device as in claim 1, wherein the radio frequency unit includes a predistortion subunit operable to compensate the object signal so as to reduce intermodulation distortion occurring in the radio frequency signal as a result of the mixing and the amplification.

8. A wireless transmission device that performs wireless transmission of a radio frequency signal generated by a signal generation device as in claim 1.

* * * * *